(12) United States Patent  
Peterson (10) Patent No.: US 6,186,060 B1
(45) Date of Patent: Feb. 13, 2001

(54) AUGER COMPACTOR FOR VEGETATION (76) Inventor: Robert W. Peterson, 13737 Road 12 SW., Royal City, WA (US) 99357

( * ) Notice: Under 35 U.S.C. 154(b), the term of this patent shall be extended for 0 days.

(21) Appl. No.: 09/203,824

(22) Filed: Dec. 1, 1998

(51) Int. Cl.$^7$ ................................. B30B 3/00; B30B 9/00
(52) U.S. Cl. ...................... 100/98 R; 100/145; 100/138
(58) Field of Search ................................... 100/145, 146, 100/150, 95, 98 R, 904, 906, 137, 138, 139

(56) References Cited

U.S. PATENT DOCUMENTS

| | | |
|---|---|---|
| 563,543 | 7/1896 | Alter . |
| 713,791 | 11/1902 | Orman . |
| 1,045,184 | 11/1912 | Randleman . |
| 1,213,171 | 1/1917 | Erfurth . |
| 2,030,031 | 2/1936 | Innes . |
| 2,080,316 | 5/1937 | Innes . |
| 2,179,937 | 11/1939 | Lamp . |
| 2,571,489 | 10/1951 | Russell . |
| 3,063,361 * | 11/1962 | Gehrke ................................. 100/98 R |
| 3,129,656 * | 4/1964 | Judd ..................................... 100/98 R |
| 3,141,401 * | 7/1964 | Lindemann et al. ................ 100/98 R |
| 3,230,902 * | 1/1966 | Grimm ................................... 100/145 |
| 3,641,754 | 2/1972 | Anstee . |
| 3,777,658 * | 12/1973 | Vosskuhler ......................... 100/98 R |
| 4,256,035 | 3/1981 | Neufeldt . |
| 4,415,336 * | 11/1983 | Stasi et al. .......................... 100/145 |
| 4,567,820 | 2/1986 | Munsell . |
| 4,852,817 * | 8/1989 | Tipton ................................. 100/98 R |
| 4,982,658 * | 1/1991 | Knudson ................................ 100/95 |
| 5,009,062 | 4/1991 | Urich et al. . |
| 5,377,481 | 1/1995 | Sibley et al. . |
| 5,389,347 * | 2/1995 | Hall ..................................... 100/73 |
| 5,391,009 * | 2/1995 | Bendzick ............................. 100/116 |
| 5,535,669 * | 7/1996 | Sibley et al. ........................ 100/145 |
| 5,575,201 * | 11/1996 | Fenner et al. ....................... 100/145 |

FOREIGN PATENT DOCUMENTS

| | | | |
|---|---|---|---|
| 105768 * | 11/1924 | (CH) | ..................................... 100/145 |
| 8401063 * | 11/1985 | (NL) | ..................................... 100/145 |

* cited by examiner

Primary Examiner—Peter Vo
Assistant Examiner—Louis Huynh
(74) Attorney, Agent, or Firm—Wells, St. John, Roberts, Gregory & Matkin, P.S.

(57) ABSTRACT

An auger compactor is described in which a hopper is provided to feed vegetation into the intake end of a compression chamber which leads from the intake end opening into the hopper to a discharge end. A first helical auger flight extends along an auger axis, of a pitch that diminishes from a maximum pitch adjacent the intake end of the compression chamber to a minimum pitch adjacent the discharge end. A second helical auger flight is also situated within the compression chamber, circumscribing and slidably supporting the first helical auger flight. The second auger flight includes a second helical pitch that also diminishes from a point adjacent the intake end of the compression chamber to a point adjacent the discharge end of the compression chamber. A drive is provided to rotate one of the flights about the auger axis, to move and compact vegetation along a flow path from the hopper through the discharge end of the compression chamber. An over-compression chamber opening into the discharge end of the compression chamber, with a compression bulkhead positioned normal to the auger axis. An over-compression member faces the compression bulkhead across the over-compression chamber and is driven to forcibly shift the over-compression member between a first position spaced from the compression bulkhead by at least a bale width dimension and a second position spaced from the compression bulkhead by a distance less than the bale width dimension.

19 Claims, 10 Drawing Sheets

_FIG. 13_

_FIG. 14_

AUGER COMPACTOR FOR VEGETATION

TECHNICAL FIELD

The present invention relates to compression of vegetation and more particularly to auger compression of vegetation.

BACKGROUND OF THE INVENTION

Augers have been used in the past for moving loose materials from one location to another. Augers have also been used to compress materials. The typical screw flights of augers, using known mechanical principles lend themselves to compaction of materials in a simple and uncomplicated manner. Augers have a further advantage over other forms of compression machinery in that compression augers usually require minimal horsepower for operation.

Augers used particularly for compacting vegetation have found use in field bailers and in stationary baling apparatus. Pelletizers, for example will often make use of an auger for progressively compressing materials into a semi-solid pellet state. The pellets are typically extruded in a continuous stream through perforations in a die. Augers used in compaction and baling of loose vegetation such as alfalfa, straw and the like, however are not typically used in an efficient manner and are generally designed to operate with a particular form of material for compaction.

In many cases shipping baled vegetation over long distances dictates that the materials to be shipped be of high density to insure maximum load concentration and in many cases pricing is gauged by container or truck load. High volume and low density becomes costly and undesirable attributes of a load.

An object of the present invention is to provide an auger compactor that will accept many different forms of cut or otherwise harvested vegetation, including (but not limited to) alfalfa hay, grasses, oats wheat barley, rape (cut for hay), and straws to be stored and shipped if desired in small dense bales.

BRIEF DESCRIPTION OF THE DRAWINGS

Preferred embodiments of the invention are described below with reference to the following accompanying drawings.

FIG. 12 is a fragmented sectional view of a second preferred form of the present auger compactor.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An auger compactor for vegetation is generally designated by reference numeral 10 in the drawings. The auger compactor 10 is provided primarily for compressing numerous forms of vegetation, particularly roughage used for livestock feeding. Such roughage may include but is not limited to alfalfa, straw hay, grass hay, and grains such as oats, wheat, barley or almost any form of vegetation that is to be compressed into small, dense bales for minimal shipping and storage volume. The present apparatus 10 will compress such materials into a dense mass that can be baled for storage and shipping.

In a preferred form, the present compactor 10 includes a hopper 12 (FIGS. 1, 2) and with an upwardly facing vegetation receiving opening 14 and a closed bottom 16. Loose vegetation is fed into the hopper 12 through the opening 14 and falls to the closed bottom 16.

Figure 2:
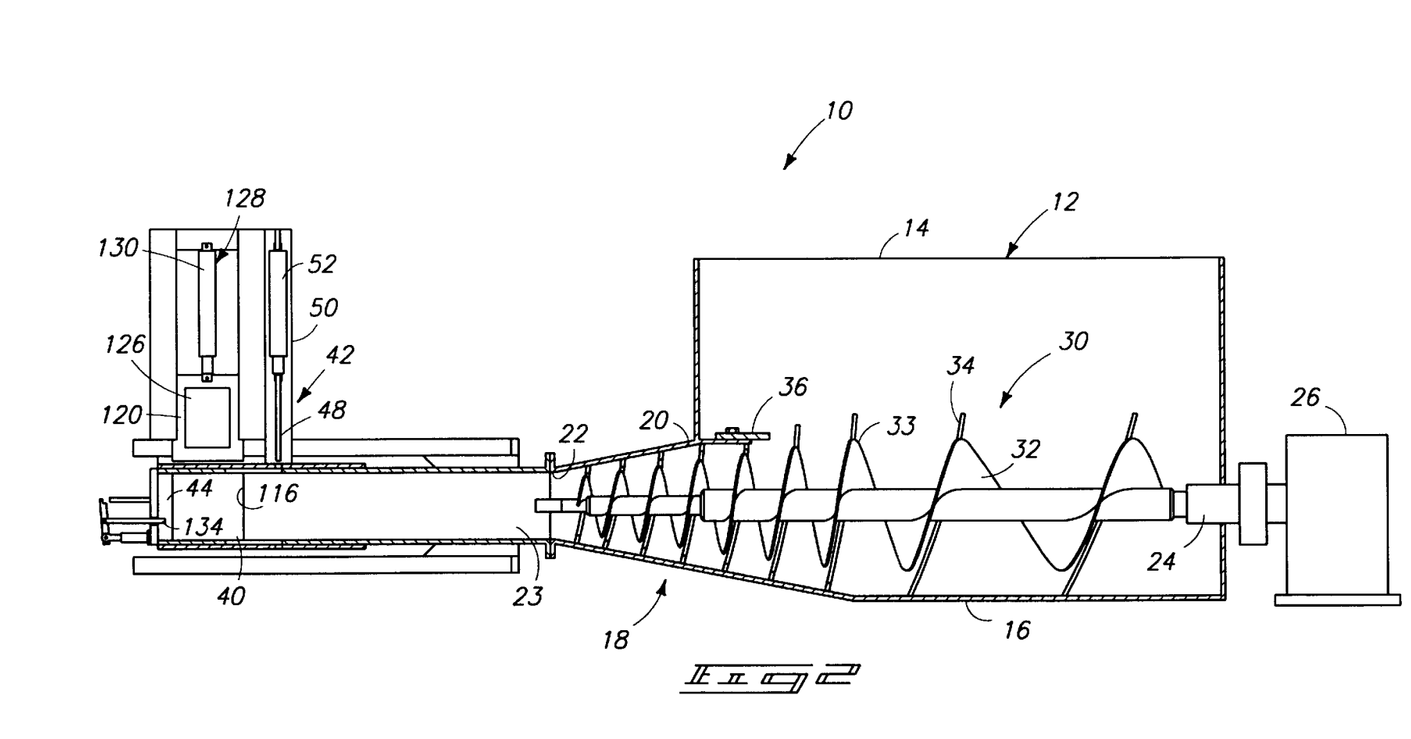
FIG. 2 is an enlarged sectional view of the first preferred form taken on a central longitudinal plane.

A compression chamber 18 leads from an intake end opening 20 into the hopper 12 to a discharge end 22 (FIG. 2). In preferred forms, chamber 18 is formed in a frusto-conical configuration, centered on a substantially horizontal central axis. The chamber 18 tapers from an enlarged end forming the intake opening 20, to a reduced section adjacent the discharge end 22.

It is also preferable that the compression chamber 18 include a transition section 23 adjacent the discharge end 22, changing in cross section from substantially circular to a substantially polygonal cross sectional configuration. It is preferred that the polygonal cross sectional configuration be substantially square and centered on the central horizontal axis of the compression chamber 18. Alternatively, the polygonal cross sectional configuration could be rectangular, hexagonal, or take another appropriate, preferably regular polygonal form. Square is preferable, since a square may be uniformly centered on the horizontal axis. Further, rectangular bales are easy to handle and stack.

An auger 30 is mounted within the hopper 12 and compression chamber 18 for rotation about an auger axis that is substantially co-axial with the central horizontal axis of the compression chamber 18. In preferred forms, the auger 30 includes a first helical flight 32 of a pitch that diminishes from a maximum pitch adjacent the intake end 20 to a minimum pitch adjacent the transition section 23 of the compression chamber 18. The preferred auger flight 32 is rotatable about the central axis of the compression chamber 18.

It is also preferable that an outer edge 33 of the first helical flight diminish in diameter (with respect to the auger axis) from a maximum diameter within the hopper 12, to a minimum diameter upstream of the compression chamber discharge end 22 (preferably adjacent the transition section 23). The taper substantially matches the taper of the compression chamber 18.

The first helical flight 32 is cantilevered by a heavy axial thrust bearing 24 at an end of the hopper 12. Thus only upstream end of the first helical flight 32 is supported, and is powered to rotate by an appropriate drive 26. The drive 26 may be comprised of an appropriate gear motor or engine that is connected to the first helical flight 32 for rotating the auger flight 32 about the auger axis to move and compact vegetation in a flow path from the hopper 12 through the discharge end 22 of the compression chamber 18.

A second helical auger flight 34 is preferably mounted within the hopper 12 and extends along the hopper bottom 16 and into the compression chamber 18. It is preferable that the second auger flight 34 be fixed in stationary relation to the hopper 12 and compression chamber 18.

It is also preferred that the second helical auger flight 34 extend into the compression chamber 18. The preferred second flight 34 will circumscribe and slidably support the outer edge 33 of first helical flight 32. The preferred second flight 34 will also have a helical pitch that diminishes from a location within the hopper adjacent the intake opening 20 to a point adjacent the transition section 23 within the compression chamber 18. It is advantageous that the flight 34 be equal in pitch to the flight 32, but wound in an opposite direction.

Both flights 32, 34 are functional to move vegetation along a flow path designated in the drawings by arrows from the hopper 12 toward the discharge end 22 of the compression chamber 18. Material is gradually compressed both axially and radially as the auger flights rotate relative to one another, moving material along form the intake opening 20 to the discharge end 22.

In order to prevent over-feeding of the auger 30 a metering flange 36 (FIG. 2) is provided in preferred forms of the invention within the hopper 12, upwardly adjacent the intake opening 20 of the compression chamber 18. The metering flange 36 partially covers and limits the amount of loose vegetation dropping into the auger flights 32 and 34. The metering flange 36 may be made to adjust horizontally up or downstream with respect to the flow path of material moved by the auger flights.

The above adjustment may be desirable to accommodate different types of vegetation and moisture content. For example, light dry material may be fed to the auger 30 through the hopper 12 at a different rate than heavy wet material.

In preferred forms of the present compactor 10, an over-compression chamber 40 is provided that is open to the discharge end of the transition section 23. The over-compression chamber 40 is formed in a preferred rectangular configuration of rigid metal plate, configured to withstand heavy internal pressure. The chamber 40 also defines a directional transition from the flow path.

In general, an over-compression member 42 is advantageously positioned substantially normal to the auger axis adjacent the over-compression chamber 40 and facing a compression bulkhead 44 across the over-compression chamber 40. An over-compression drive 46 (FIG. 1) is connected to the over-compression member 42 and is operable to forcibly shift the over-compression member 42 from a first position representing a bale width dimension and a second position less than the bale width dimension.

Figure 1:
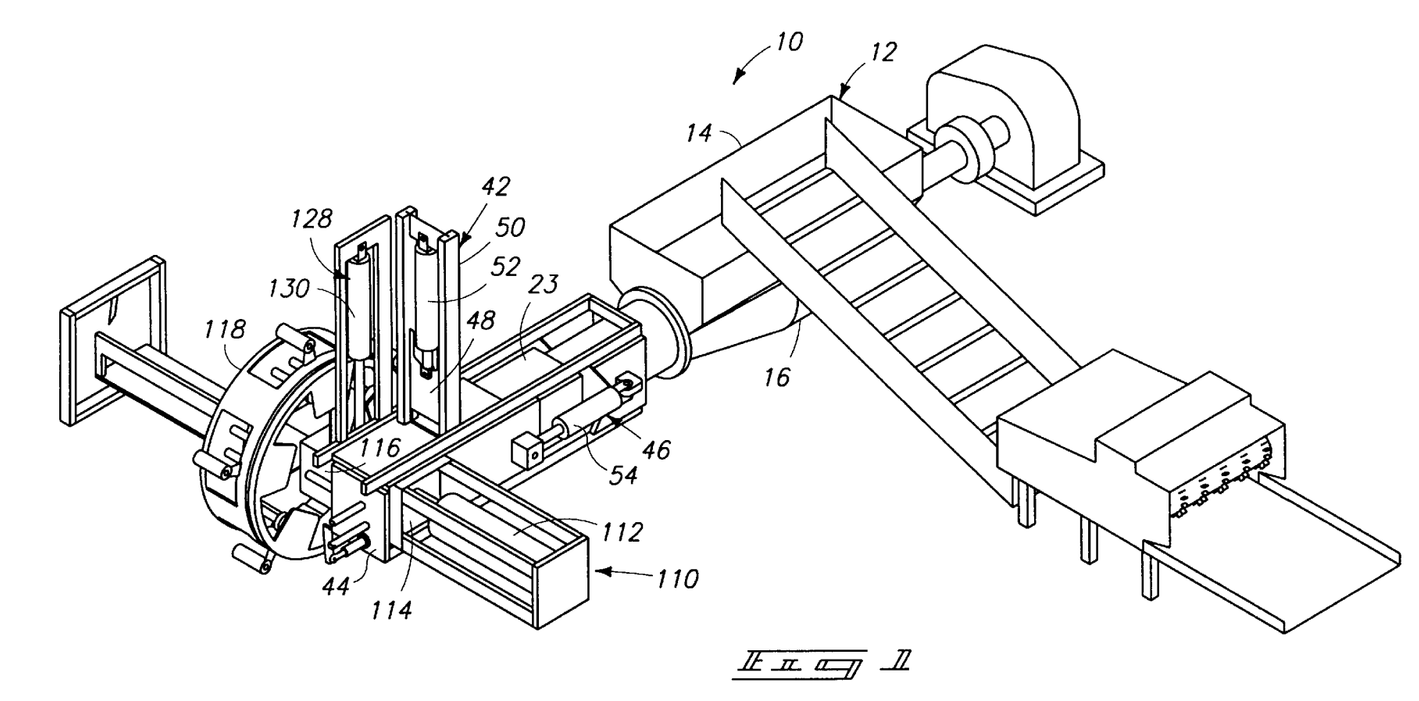
FIG. 1 is a perspective view of a first preferred form of the present auger compactor.

In the first preferred embodiment, the over-compression member 42 is provided as a rigid planar knife 48 carried by a movable guide 50. The over-compression drive 46 includes an upright cylinder 52 that forcibly shifts the knife 48 from an elevated inoperative position above the flow path, to a down position intersecting the flow path. The over-compression drive 46 also incudes a set of horizontal cylinders 54 connected between the guide 50 and stationary framework to shift the knife 48 and guide 50 between the first and second positions.

Thus the knife 48 in the first preferred form serves to (a) cut downwardly through the compressed vegetation, then (b) over-compress the vegetation against the bulkhead 44, compressing the bale to a width smaller than the final finished bale width. The knife 48 (still lowered) is then returned back upstream, to a position spaced from the compression bulkhead 44 a distance substantially equal to a finished bale width, leaving the over-compressed bale to slightly expand back to the finished compressed bale configuration.

It is preferred that horizontal movement of the knife 48 from the first to the second position be faster than the feed rate of the vegetation moving along by action of the auger flights 32, 34. By doing this, a charge of vegetation will be indexed along the flow path into the over-compression chamber 40, forming a gap in the stream of compressed material advancing from the auger 30 behind and upstream of the knife 48. This gap will gradually narrow with continuous operation of the auger flights 32, 34, but will be sufficient to allow the cylinders 54 and 52 to extend and retract, horizontally shifting then lifting the knife 48 up and back to the elevated inoperative first position following the over-compression stroke.

Figure 5:
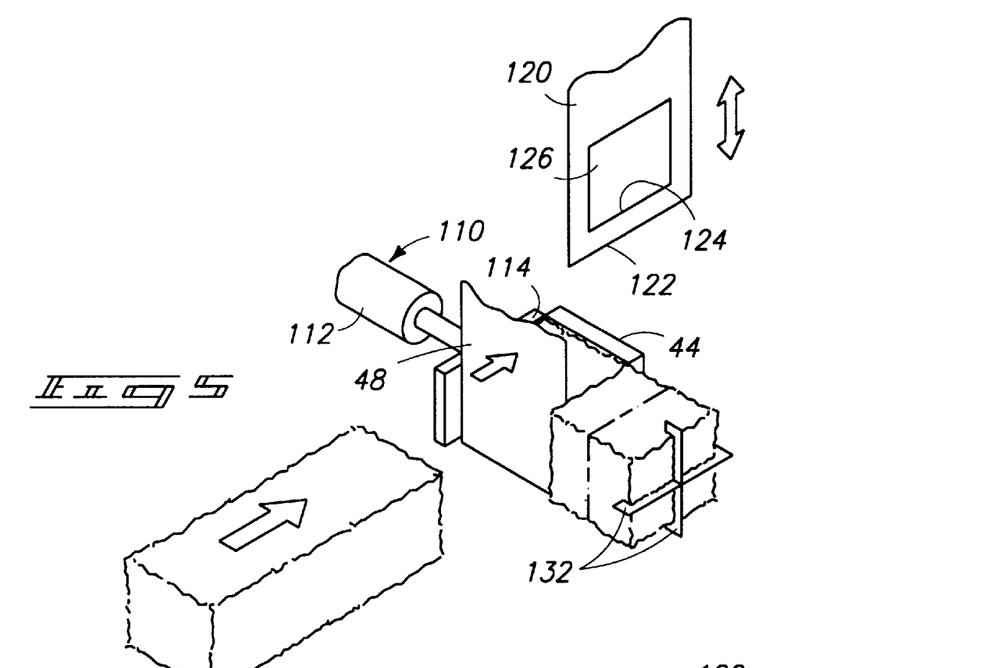
Figure 6:
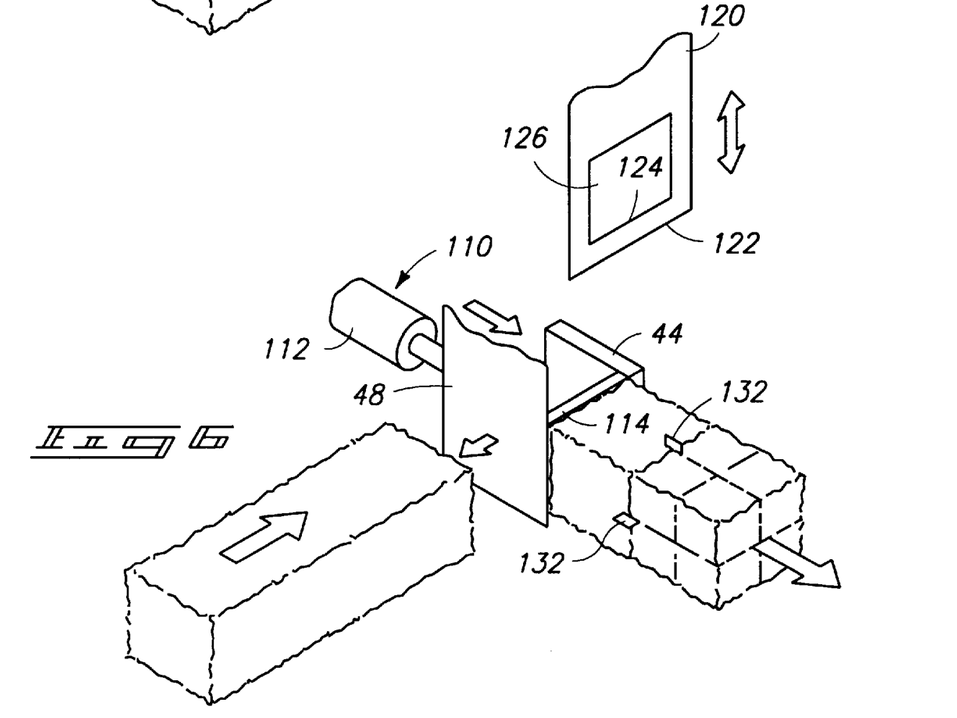
Figure 7:
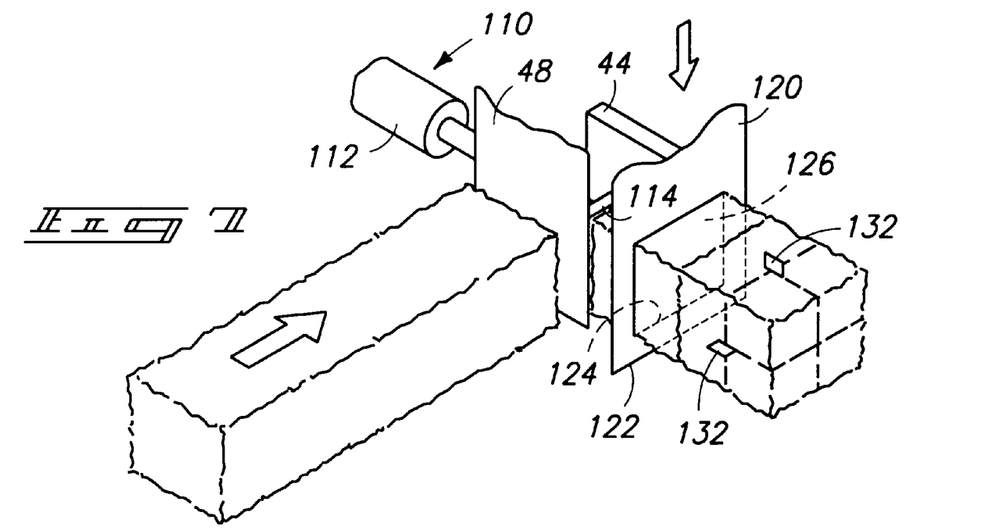
Figure 8:
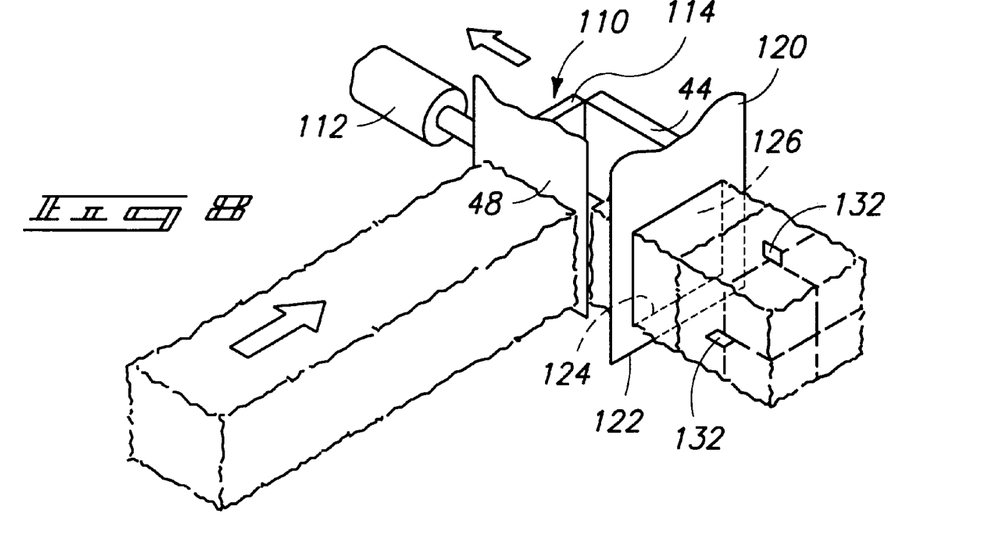
Figure 9:
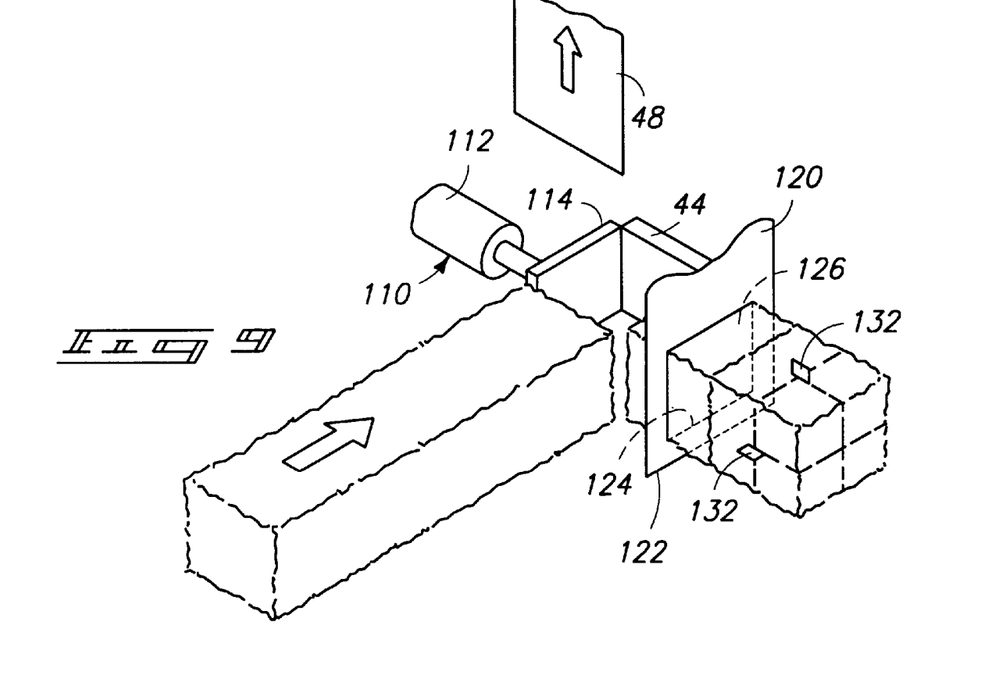
Figure 10:
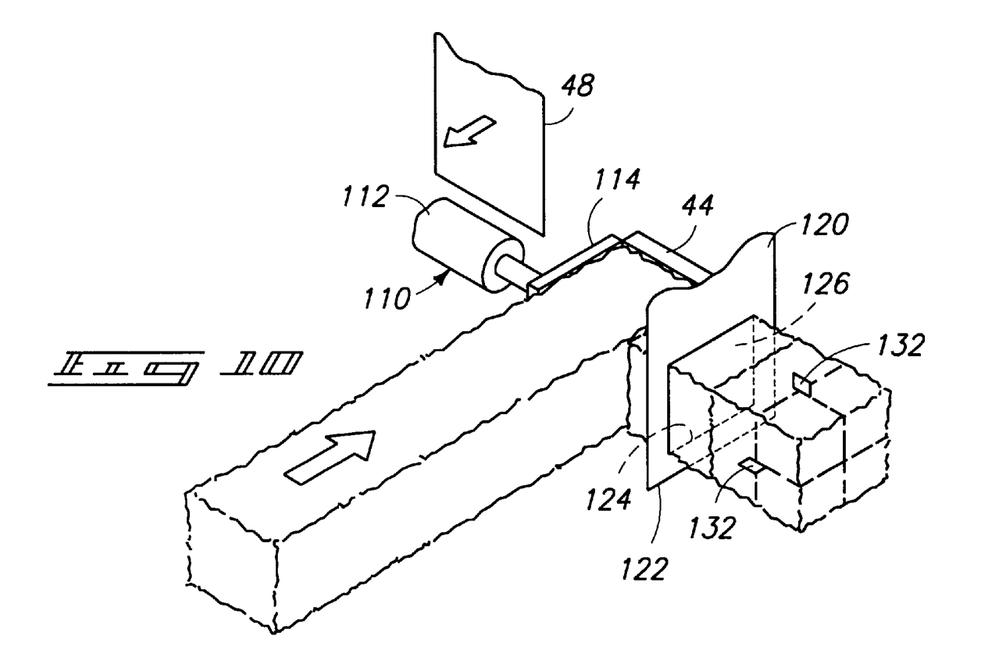

In a summary of the over-compression steps, the knife 48 is initially lowered to the first position (FIGS. 3, 4), slicing through the auger-fed material. Next, the knife 48 (and guide 50) is pushed quickly downstream to the second position (FIG. 5), over-compressing the engaged charge of material and producing a gap ahead of the advancing stream of material from the auger flights 32, 34. Next the knife 48 is moved back upstream to a distance from the compression bulkhead 44 approximately equal to the width of the finished bale (FIG. 6). Discharge of the bale then takes place and the knife 48 is again elevated and shifted back to the starting position, ready for the next charge. The auger flights 32, 34 continue to operate during all these steps, slowly advancing the vegetation to bring the next successive charge of material toward the bulkhead 44.

In a second preferred form (FIG. 12), a compression bulkhead 88 is positioned normal to the auger axis on a side of the over-compression chamber 40. The bulkhead 88 is similar to the knife 48 described above, with the exception that the bulkhead 88, unlike knife 48, is only movable in a vertical plane. That is, the bulkhead 88 is moved only between an elevated, inoperative position above the compression chamber 18 and a lowered operative position spanning the transition section of the compression chamber 18. The bulkhead 88 defines one side of the over-compression chamber 40 when in the lowered operative position. A frame mounted cylinder 90 is used with a guide 92 (which slidably mounts the bulkhead 88) to selectively shift the bulkhead 88 between the inoperative and operative positions.

Also in the second preferred form, an over-compression member 94 is positioned substantially normal to the auger axis adjacent the over-compression chamber 40 and faces the compression bulkhead 88 across the over-compression chamber 40. An over-compression drive 96 is connected to the over-compression member 94 and is operable to forcibly shift the over-compression member 94 from a first position spaced from the compression bulkhead 88 by a finished bale width dimension and a second position spaced from the compression bulkhead 88 by a distance less than the finished bale width dimension.

Figure 13:
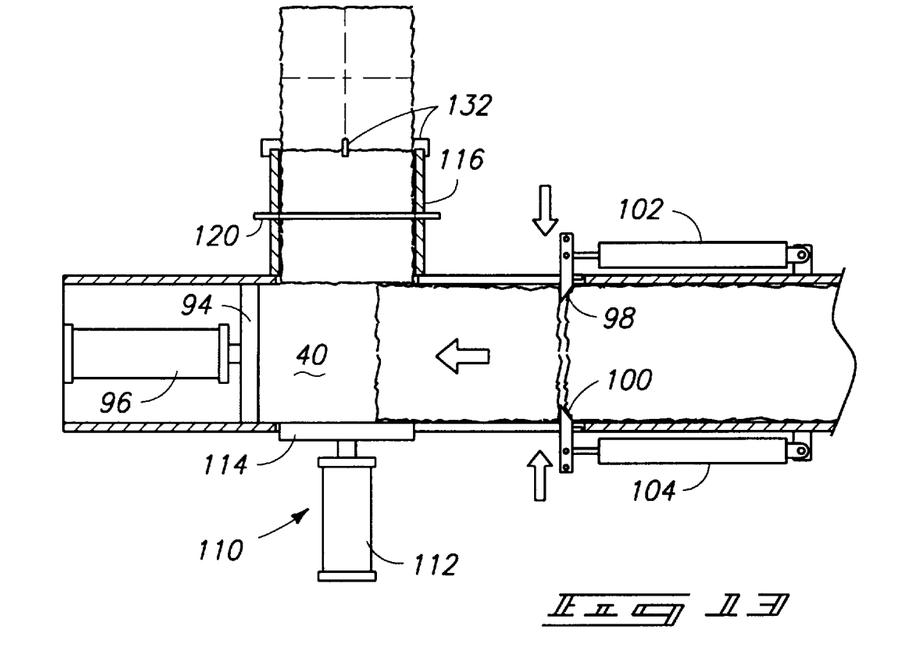
FIGS. 13–16 are diagrammatic operational views showing operation of the second preferred form.
Figure 14:
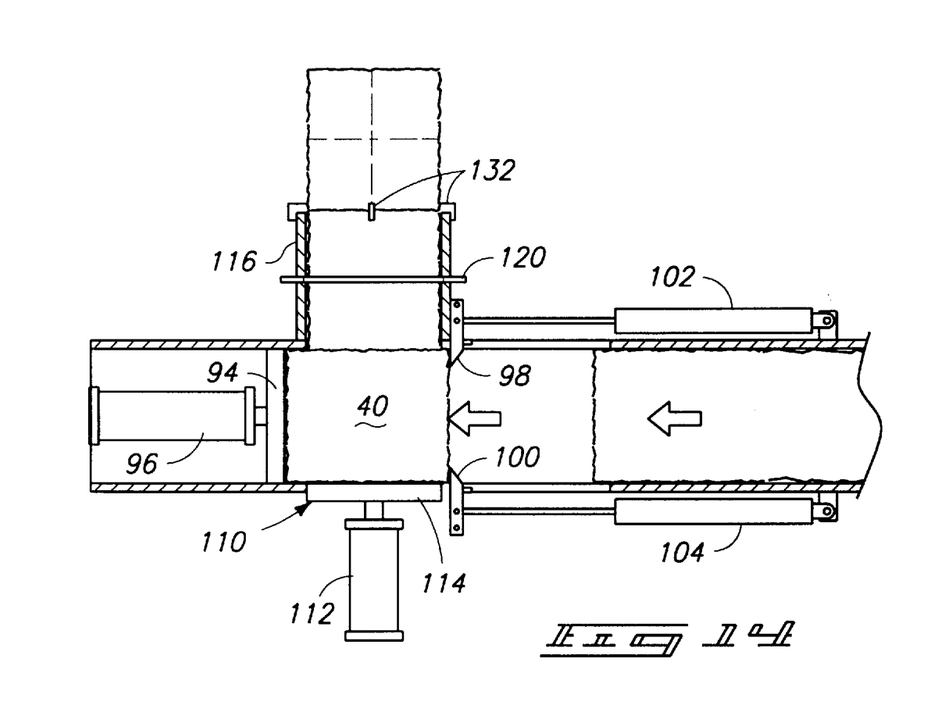

A retractable set of dogs 98, 100 (FIGS. 13–16) are mounted to sides of the transition part of compression chamber 18 upstream of the bulkhead 88 for reciprocating movement to engage and shift successive charges of material from the compression chamber 18 into the over-compression chamber 40. The dogs 98, 100 are connected to respective frame mounted cylinders 102, 104 which upon activation, cause the dogs 98, 100 to penetrate the material in the compression chamber 18 (FIG. 13).

The cylinders 102, 104 also move the dogs 98, 100 to shift the engaged charge of material quickly into the over-compression chamber 40 (FIG. 14) ahead of the stream of material that is continuously and slowly advancing due to continuous operation of the auger 30. This action also produces a gap between the engaged charge of material (which is quickly indexed ahead) and the slower moving yet continuously advancing stream of material. Reverse operation of the cylinders 102, 104 causes the dogs to retract (FIGS. 15, 16) and move back upstream to their initial starting positions.

In both embodiments exemplified above an ejector member 110 is provided. In preferred forms, the ejector member 110 is comprised of a rigid ejection plate 114 that forms one side of the over-compression chamber 40. It moves laterally (with respect to the flow path) to push each bale from the machine.

An ejector drive 112 is mounted to the ejector member 110 and operates to shift the ejection plate 114 laterally of the flow path along an ejection path between the compression member and bulkhead 44 (of either embodiment). The stroke length of the ejector drive 112 is approximately equal to the desired length dimension of a finished bale. Thus for each stroke of the ejector drive 112, a finished bale is ejected from the machine.

An ejection tube 116 (shown in FIGS. 13–16 but not in FIGS. 3–11 for clarity) is affixed to the framework downstream with respect to the ejection path and opens into the over-compression chamber 40. The ejection tube 116 receives successive charges from the ejector and directs the charges to an appropriate wrapping device 118 (FIG. 1) similar to that disclosed in my prior U.S. Pat. Nos. 5,433,058 and 5,531,061 parts thereof relating to bale wrapping being hereby incorporated by reference into the present application.

If desired, a bale end cutting knife 120 may be positioned between the over-compression chamber 40 and ejection tube 116. Preferably, the end cutting knife 120 is located along the ejection tube 116 by a distance equal to one half of the desired bale length. The distance is measured from the ejection plate 114 at the downstream end of the ejection stroke (FIG. 6). Thus, after the ejector functions to eject a bale, the bale end cutting knife 120 may be forced through the bale, cutting the bale in half.

In a preferred form, the bale end cutting knife 120 includes a bottom cutting edge 122 and a top cutting edge 124. The top cutting edge 124 forms one side of an opening 126 that is preferably sightly larger than the cross-sectional size of a bale. The opening 126 is aligned with the ejection tube 116 when the bale end cutting knife 120 is in a down position, to permit passage of a bale pushed outwardly by the ejector member 110. Thus the bale end cutting knife 120 may be forced downwardly through a bale, with the bottom cutting edge 122 cutting the bale in half. The bale end cutting knife 120 may then be held in the down position while the ejection plate 114 functions to push another bale through the opening 126. Now the bale end cutting knife 120 may be raised, cutting the subsequent bale in half on the up stroke, using the top cutting edge 122.

A bale end cutting knife drive 128 (FIGS. 1, 2, 12) is connected to the bale end cutting knife 120 to forcibly shift either of the blade edges 122, 124 in a cutting stroke through the ejection tube 116. The knife drive 128 may be comprised of an upright cylinder 130 connected between the bale cutting knife 120 and the general stationary framework. Extension of the cylinder 130 will cause the knife 120 to move through the ejection tube 116 in a down stroke, and retraction of the cylinder 130 will cause the knife 120 to cut on the up stroke.

In a preferred form, a stationary bale sectioning knife or knives 132 may also be mounted, if desired, in the ejection tube 116 to progressively divide the bales as they are pushed outwardly by the ejector member. The knives 132 may be releasably mounted within the ejection tube 116 are positioned upstream of the bale wrapping device 118.

The bale wrapping device 118 is preferably positioned to wrap successive bale halves so the ends cut by the end cutting knife 120 are exposed outwardly. Relatively smoothly cut square surfaces are thus exposed for ease in stacking and shipping. Further, the finished, wrapped bales are wrapped about the cut sections (quarter sections being shown) so the bale may be easily opened and divided into relatively small cubes of compressed material for ease in handling.

OPERATION

Operation of the present compactor 10 will be described starting with vegetation being fed into the hopper 12. Feed of loose materials may be accomplished using a standard conveyor, and an upstream vegetation separator. If, for example baled hay is to be compacted, successive bales are placed on the conveyor and the separator may be used to reduce the bales to loose material. It is not necessary that the vegetation be chopped or shredded, although the present machine will function with small particles. It is desirable simply that the vegetation be loose for even feeding to the hopper 12. If the material is found to be too dry, moisture may be added at this point to improve consistency and the ultimate integrity of the compressed bales.

Loose material is fed into the open top end of the hopper 12. If over feeding occurs, the metering flange 36 will prevent excess material from binding in the auger flights 32, 34. The material will simply rest on the metering flange 36 until such time that the auger flights have removed enough material that the excess will fall off the flange into the hopper bottom 16.

The flange 36 may also be adjusted according to the nature of vegetation being compacted and the desired degree of compaction. The auger flights decrease progressively in pitch through the hopper 12 and down the compression chamber 18. By closing off a selected area in the hopper 12 above the decreased pitch area of the auger flights 32, 34, the flange 36 forces more material into the spaces between the flights. More material is therefore gathered between wraps of the flights 32, 34, ultimately increasing density of the bales.

Vegetation within the hopper 12 is caught up between the auger flight 32 and is moved along with assistance from the stationary helical flight 34 which, by reason of its reverse twist, helps move the material along the path through the compression chamber 18. Compaction density of the material gradually increases with the diminishing pitch of both auger flights 32, 34, and the decreasing diameter of the compression chamber 18. The material thus compacts into a continuous, extruded mass. The material will close onto itself upon leaving the auger 30, so the auger shaft will not leave a hollow core in the compressed material.

Along the transition section 23 the circular extruded mass is transformed from a circular to a square cross-sectional configuration. The material continues to move along now within the square section until the leading end of the mass engages a trip switch 134 (FIGS. 2, 12).

The trip switch 134 is located in the bulkhead 44 in the first preferred form and along the over-compression member 94 in the second preferred form. In either form, the trip switch 134 is actuated by the advancing mass of material that has been substantially compressed by the auger flights.

Figure 3:
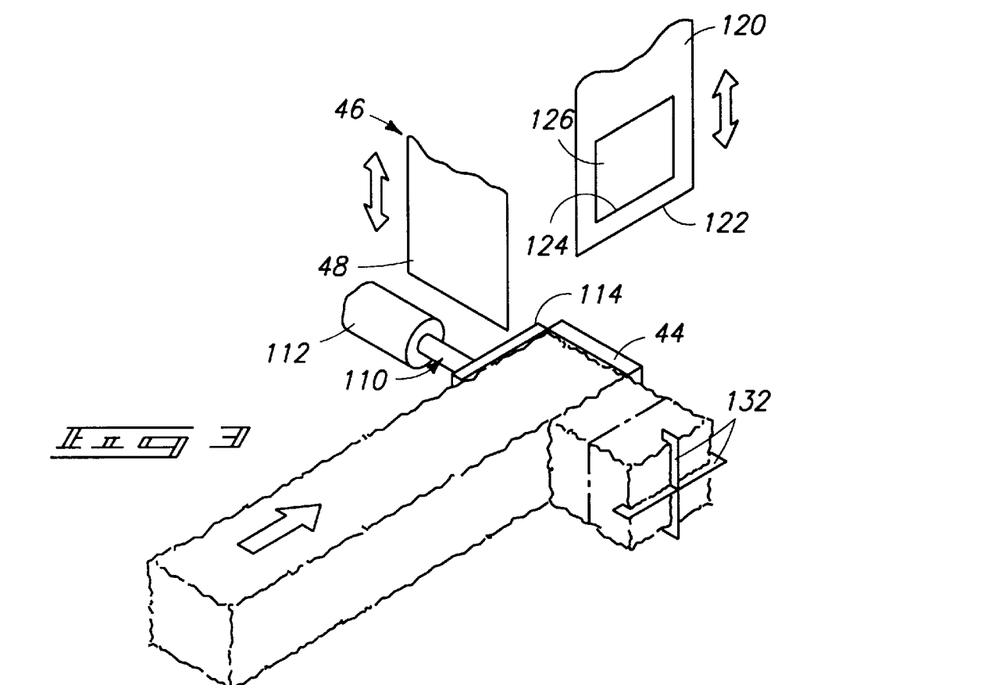
FIGS. 3–11 are diagrammatic operational views showing operation of the first preferred form.
Figure 4:
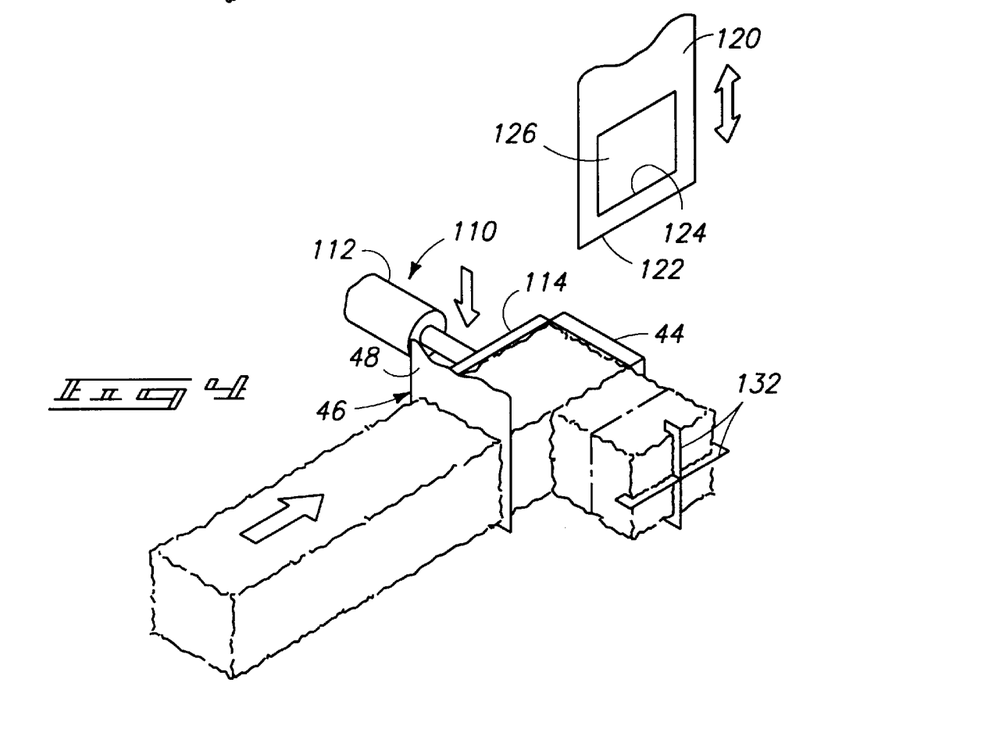

In the first preferred form, the trip switch 134 initiates a sequence of events starting with the over-compression drive 46. Firstly, the upright cylinder 52 is actuated to lower the knife 48 to the first position, slicing through the auger-fed material below (FIGS. 3, 4). This separates a charge of material from the remaining, still advancing mass of material.

At approximately the same time, the knife 48 and guide 50 are pushed by the horizontal cylinders 54 quickly downstream to the second position (FIG. 5), over-compressing the engaged charge of material and producing a gap ahead of the advancing stream of material from the auger flights 32, 34. Next the knife 48 is moved back upstream (FIG. 6) to a distance from the bulkhead 44 approximately equal to the width of the finished bale. The over-compressed bale will partially re14 expand to the ultimate bale width and will remain substantially at this width after discharge.

Figure 15:
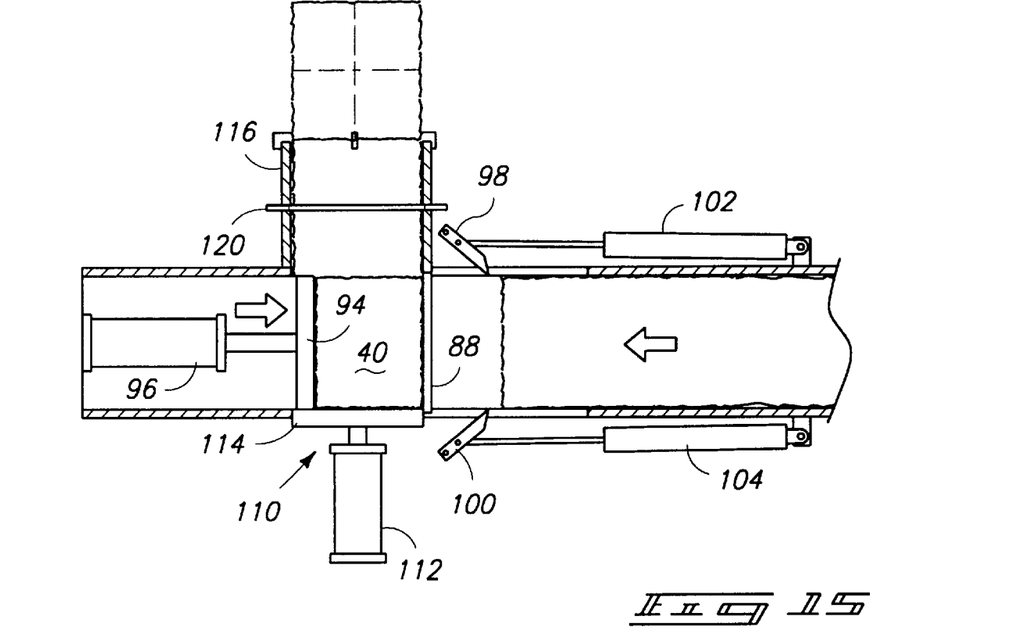
Figure 16:
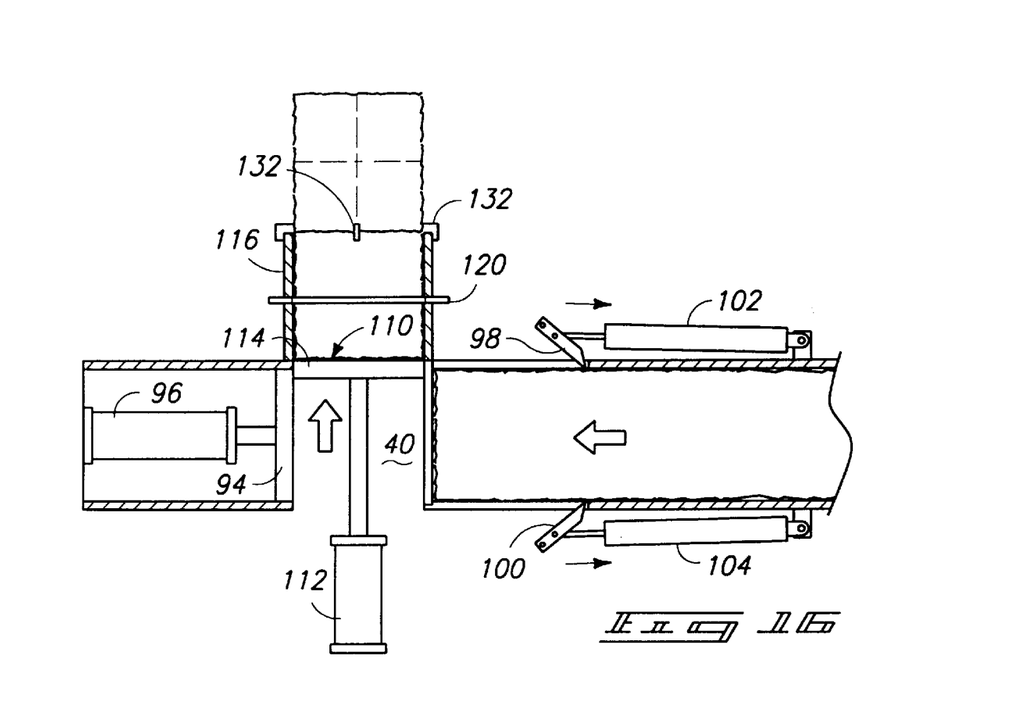

In operation of the second preferred form, the switch 134 actuates one or both of the cylinders 102, 104 to move either or both of the retractable dogs 98, 100 into the mass of material (FIG. 13) and shift the engaged charge downstream (FIG. 14) into engagement with the over-compression plate 94. At this point, the dog or dogs 98, 100 are retracted to the starting position and the bulkhead 88 is lowered into position spanning the compression chamber 18 (FIGS. 15, 16). Once the bulkhead 88 is fully lowered, the over-compression member 94 is driven toward the bulkhead 88, over-compressing the charge of material to a size smaller than the finished bale width (FIG. 15). This is accomplished by operation of the over-compression drive 96, which next acts to retract the over-compression member 42 to a position forming a side of the over-compression chamber 40 in alignment with one wall of the ejection tube 116. The opposite wall is defined by the lowered bulkhead 88.

In both of the above exemplified forms, discharge of the bale takes place with successive strokes of the ejector member 110. The ejector drive 112 moves the ejection plate 114 against the bale and pushes it laterally of the flow path into the ejection tube 116 (FIGS. 6, 16). The ejection plate 114 passes between the knife 48 and bulkhead 44 in the first preferred form and between the compression member 94 and compression bulkhead 88 in the second form.

Each stroke of the ejector drive 112 shifts a bale a distance equal to a full bale length into the ejection tube 116 (FIGS. 6, 16). Half the bale length will be shifted past the bale end cutting knife 120 which is actuated to cut through the bale, halving the bale length. The bale is also pushed against the fixed bale sectioning knives 132 which (if used) progressively cut the bale longitudinally into sections as the ejector drive 112 pushes successive bales through the ejection tube 116.

Figure 11:
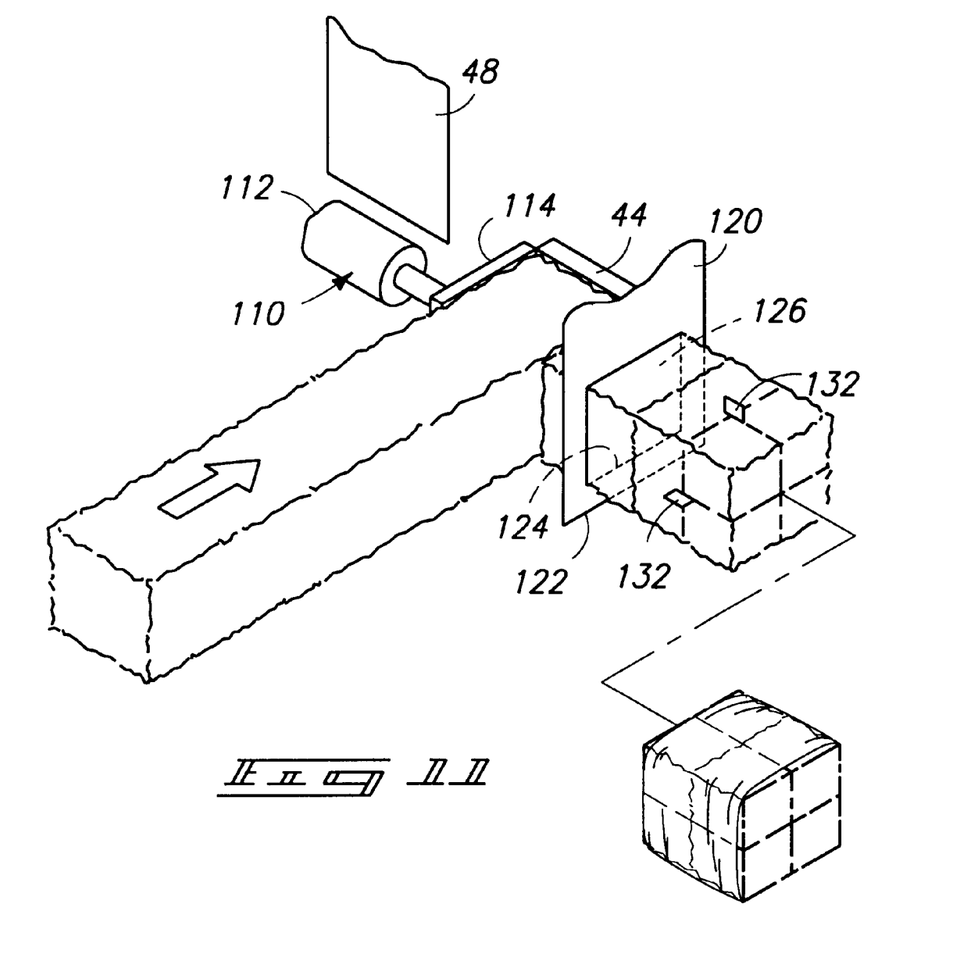

The bale wrapping device 118 is situated downstream of the bale sectioning knives 132 and adjacent the discharge end of the ejection tube 116. The wrapping device 118 functions to tightly wrap each bale before it is finally ejected from the machine (FIG. 11). It is noted that the uncut ends of successive bales face one another within each bale, and that the cut ends (cut by action of the end cutting knife 120) are exposed at the bale ends. Thus a rectangular bale is formed with the wrap extending about four sides of the bale, and the smooth cut ends are exposed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An auger compactor for vegetation, comprising:
    a hopper with an upwardly facing vegetation receiving opening;
    a compression chamber leading from an intake end opening into the hopper to a discharge end;
    a first helical auger flight extending along an auger axis, of an axial pitch that diminishes from a maximum pitch adjacent the intake end of the compression chamber to a minimum pitch adjacent the discharge end;
    a second helical auger flight mounted within the compression chamber, circumscribing and slidably supporting the first helical auger flight and having a second axially diminishing helical pitch, diminishing from a maximum pitch at a point adjacent the intake end of the compression chamber to a minimum pitch at a point adjacent the discharge end of the compression chamber;
    wherein the first and second auger flights are wound in opposite directions, and
    a drive connected to one of the flights for rotating the one flight about the auger axis and thereby move and compact vegetation along a flow path from the hopper through the discharge end of the compression chamber.

2. An auger compactor for vegetation as claimed by claim 1, wherein the first and second auger flights are axially tapered to include diameters that diminish from maximum diameters adjacent the intake end to minimum diameters adjacent the discharge end, and wherein the compression chamber is similarly tapered.

3. An auger compactor for vegetation as claimed by claim 1, wherein the compression chamber includes a transition section adjacent the discharge end, changing in cross section from substantially circular to a substantially polygonal cross sectional configuration.

4. An auger compactor for vegetation as claimed by claim 1, further comprising:
    an over-compression chamber opening into the discharge end of the compression chamber;
    a compression bulkhead positioned normal to the auger axis in the over-compression chamber;
    an over-compression member positioned substantially normal to the auger axis adjacent the over-compression chamber and facing the compression bulkhead across the over-compression chamber; and
    an over-compression drive connected to the over-compression member and operable to forcibly shift the over-compression member from a first position spaced from the compression bulkhead by at least a bale width dimension and a second position spaced from the compression bulkhead by a distance less than the bale width dimension.

5. An auger compactor for vegetation as claimed by claim 1, further comprising:
    an over-compression chamber opening into the discharge end of the compression chamber;
    a compression bulkhead positioned normal to the auger axis in the over-compression chamber;
    an over-compression member positioned substantially normal to the auger axis adjacent the over-compression chamber upstream along the flow path from the compression bulkhead and facing the compression bulkhead across the over-compression chamber; and an over-compression drive connected to the over-compression member and operable to forcibly shift the over-compression member from (a) an inoperative position clear of the flow path to (b) a first position spanning the flow path and spaced upstream from the bulkhead by a bale width dimension and to (c) a second position less than the bale width dimension.

6. An auger compactor for vegetation as claimed by claim 1, further comprising:
an over-compression chamber opening into the discharge end of the compression chamber;
a compression bulkhead positioned normal to the auger axis in the over-compression chamber;
an ejection plate formed in a plane substantially normal to the compression bulkhead;
an ejector drive mounted to the ejection plate and operable to shift the ejection plate laterally of the flow path along an ejection path; and
an ejection tube downstream with respect to the ejection path and opening into the over-compression chamber.

7. An auger compactor for vegetation as claimed by claim 1, further comprising:
an ejection tube downstream with respect to the flow path along the compression chamber; and
a bale sectioning cutter spanning the ejection tube.

8. An auger compactor for vegetation as claimed by claim 1, further comprising:
a bale end cutter positioned adjacent the discharge end; and
a bale end cutter drive connected to the bale end cutter to forcibly shift the bale end cutter across the flow path.

9. An auger compactor for vegetation, comprising:
an upright hopper having a top vegetation receiving opening and a closed bottom;
a substantially horizontal compression chamber having an intake end opening into the hopper adjacent the closed bottom and leading to a remote discharge end;
a horizontally adjustable metering flange within the hopper upwardly adjacent the intake end of the compression chamber;
auger flights within the compression chamber and extending into the hopper below the metering flange;
wherein one of the auger flights is mounted for rotation about an auger axis, and includes a pitch that diminishes along the axis from a maximum pitch within the hopper to a minimum pitch within the compression chamber.

10. An auger compactor for vegetation as claimed by claim 9, wherein the auger flight is tapered from a maximum diameter adjacent the intake end of the compression chamber to a minimum diameter within the compression chamber, and wherein the compression chamber is similarly tapered.

11. An auger compactor for vegetation as claimed by claim 9, wherein the compression chamber includes a transition section adjacent the minimum pitch of the auger flight, changing in cross section from substantially circular to a substantially polygonal cross sectional configuration.

12. An auger compactor for vegetation as claimed by claim 9, further comprising:
an over-compression chamber opening into the discharge end of the compression chamber;
a compression bulkhead positioned normal to the auger axis adjacent the over-compression chamber;
an over-compression member positioned substantially normal to the auger axis adjacent the over-compression chamber and facing the compression bulkhead across the over-compression chamber; and
an over-compression drive connected to the over-compression member and operable to forcibly shift the over-compression member toward and away from the compression bulkhead.

13. An auger compactor for vegetation as claimed by claim 9, further comprising:
an over-compression chamber opening into the discharge end of the compression chamber;
a compression bulkhead positioned normal to the auger axis in the over-compression chamber;
an ejection plate formed in a plane substantially normal to the compression bulkhead;
an ejector drive mounted to the ejection plate and operable to shift the ejection plate laterally of the flow path along an ejection path; and
an ejection tube downstream with respect to the ejection path and opening into the over-compression chamber.

14. An auger compactor for vegetation as claimed by claim 9, further comprising:
an over-compression chamber opening into the discharge end of the compression chamber;
a compression bulkhead positioned normal to the auger axis on the over-compression chamber;
an ejection plate formed in a plane substantially normal to the compression bulkhead;
an ejector drive mounted to the ejection plate and operable to shift the ejection plate laterally of the flow path along an ejection path;
an ejection tube downstream with respect to the ejection path and opening into the over-compression chamber; and
a bale sectioning knife mounted to the ejection tube.

15. An auger compactor for vegetation as claimed by claim 9, further comprising:
an over-compression chamber opening into the discharge end of the compression chamber;
a compression bulkhead positioned normal to the auger axis;
an ejection plate formed in a plane substantially normal to the compression bulkhead;
an ejector drive mounted to the ejection plate and operable to shift the ejection plate laterally of the flow path along an ejection path;
an ejection tube downstream with respect to the ejection path and opening into the over-compression chamber;
a bale end cutting knife positioned along the ejection tube; and
a bale end cutting knife drive connected to the bale end cutting knife to forcibly shift the bale end cutting knife in a cutting stroke across the ejection tube.

16. An auger compactor for vegetation, comprising:
a hopper for receiving vegetation;
an elongated compression chamber of circular cross-sectional configuration tapering longitudinally from an enlarged section opening into the hopper, to a reduced section at a discharge end;
a first helical auger flight within the compression chamber for rotation about an auger axis;
a second helical auger flight formed about the auger axis within the compression chamber and including an inner edge formed about and along the auger axis;

the first helical auger flight having an outer edge adjacent the inner edge of the second helical auger flight;

said first and second helical auger flights being tapered to conform to the taper of the compression chamber;

wherein the first and second helical auger flights include diminishing pitch leading toward the reduced section;

a drive connected to one of the auger flights and configured to rotate the one auger flight about the auger axis to move and compress material from the hopper to the discharge end of the compression chamber; and wherein the first and second auger flights are wound in opposite directions.

17. An auger compactor for vegetation as claimed by claim 16, wherein the compression chamber includes a transition section adjacent the discharge end, changing in cross section from substantially circular to a substantially polygonal cross sectional configuration.

18. An auger compactor for vegetation, comprising:

a hopper for receiving vegetation;

a compression chamber of circular cross-sectional configuration tapering longitudinally along a central axis from an enlarged section opening into the hopper, to a reduced section at a discharge end;

a first helical auger flight including an outer edge formed about an auger axis within the compression chamber and mounted for rotation about the auger axis;

a second helical auger flight within the compression chamber and secured in stationary relation to the first auger flight;

the second helical auger flight including an inner edge adjacent the outer edge of the first helical auger flight;

said first and second helical auger flights being tapered along the auger axis to conform to the taper of the compression chamber;

wherein the first and second helical auger flights each include an axially diminishing pitch leading toward the reduced section;

wherein the first and second helical auger flights are wound in opposite directions; and a drive connected to the first auger flights and configured to rotate the first auger flight about the auger axis to move and compress material from the hopper to the discharge end.

19. An auger compactor for vegetation as claimed by claim 18, comprising:

an over-compression chamber opening into the discharge end of the compression chamber;

a compression bulkhead positioned normal to the auger axis on a side of the over-compression chamber;

an ejector member including an ejection plate formed in a plane substantially normal to the compression bulkhead; and an ejector drive mounted to the ejector member and operable to shift the ejection plate laterally of the compression chamber.

* * * * *